United States Patent [19]
Sceusa

[11] Patent Number: 5,693,220
[45] Date of Patent: Dec. 2, 1997

[54] AQUARIUM FILTRATION SYSTEM FOR SEMI-AQUATIC ANIMALS

[76] Inventor: Nicholas A. Sceusa, 145 W. 96th St., Apt. 1A, New York, N.Y. 10025-6449

[21] Appl. No.: 632,063

[22] Filed: Apr. 15, 1996

[51] Int. Cl.⁶ ............................................. A01K 63/04
[52] U.S. Cl. ..................... 210/151; 210/169; 210/232; 210/266; 210/283; 210/416.2; 119/211; 119/227; 119/247; 119/260; 119/269
[58] Field of Search ........................... 119/211, 226, 119/227, 247, 253, 259, 260, 269; 210/150, 151, 169, 232, 166, 282, 283, 416.2

[56] References Cited

U.S. PATENT DOCUMENTS

| | | | |
|---|---|---|---|
| 3,141,442 | 7/1964 | Harris | 119/246 |
| 4,093,546 | 6/1978 | Taborsky | 119/227 |
| 4,268,387 | 5/1981 | Hall | 210/169 |
| 4,851,112 | 7/1989 | Schlensker | 210/169 |
| 4,897,188 | 1/1990 | Ogawa | 210/169 |
| 4,936,981 | 6/1990 | Baisley et al. | 210/169 |
| 5,409,603 | 4/1995 | Tsung | 210/169 |
| 5,560,318 | 10/1996 | Yoshida et al. | 119/227 |
| 5,567,315 | 10/1996 | Weidenmann et al. | 210/169 |

*Primary Examiner*—Stanley S. Silverman
*Assistant Examiner*—Theodore M. Green
*Attorney, Agent, or Firm*—Breiner & Breiner

[57] ABSTRACT

An aquarium filtration system for semi-aquatic animals, such as turtles, frogs and the like, which provides for collection and removal of waste material or debris generated within the aquarium while also providing for an artificial pond and a sunning platform for the semi-aquatic animals. The filtration system includes a multi-layer reverse flow filter, a plurality of collecting tubes which support the reverse flow filter, an inclined ramp structure providing exit and entry between the artificial pond and sunning platform while also serving as a filter structure, and a biological filtration unit which also provides a sunning platform. The filtration system provides for a circulating flow of water contained within the aquarium through filter media while creating an artificial pond and sunning platform.

14 Claims, 4 Drawing Sheets

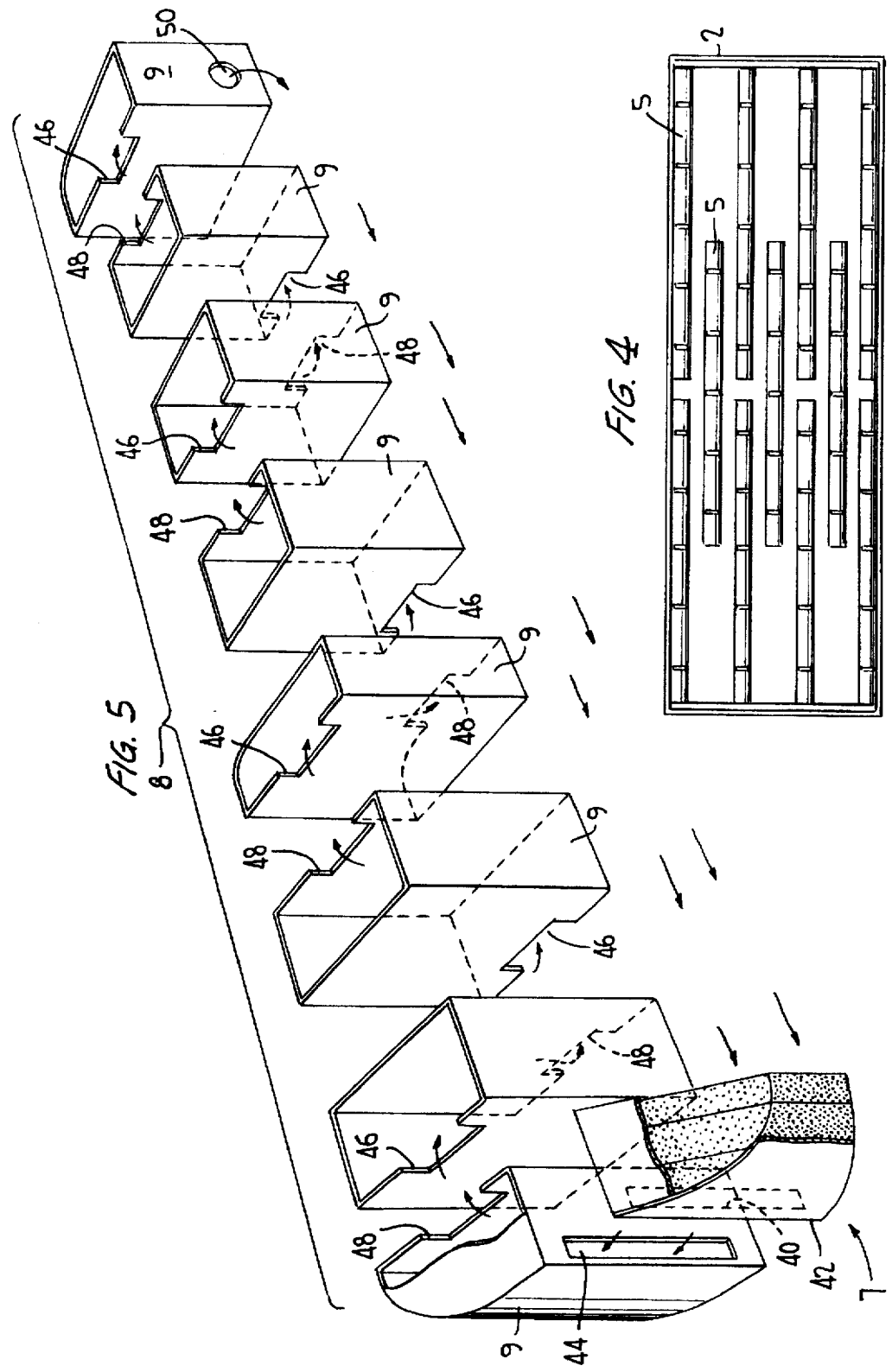

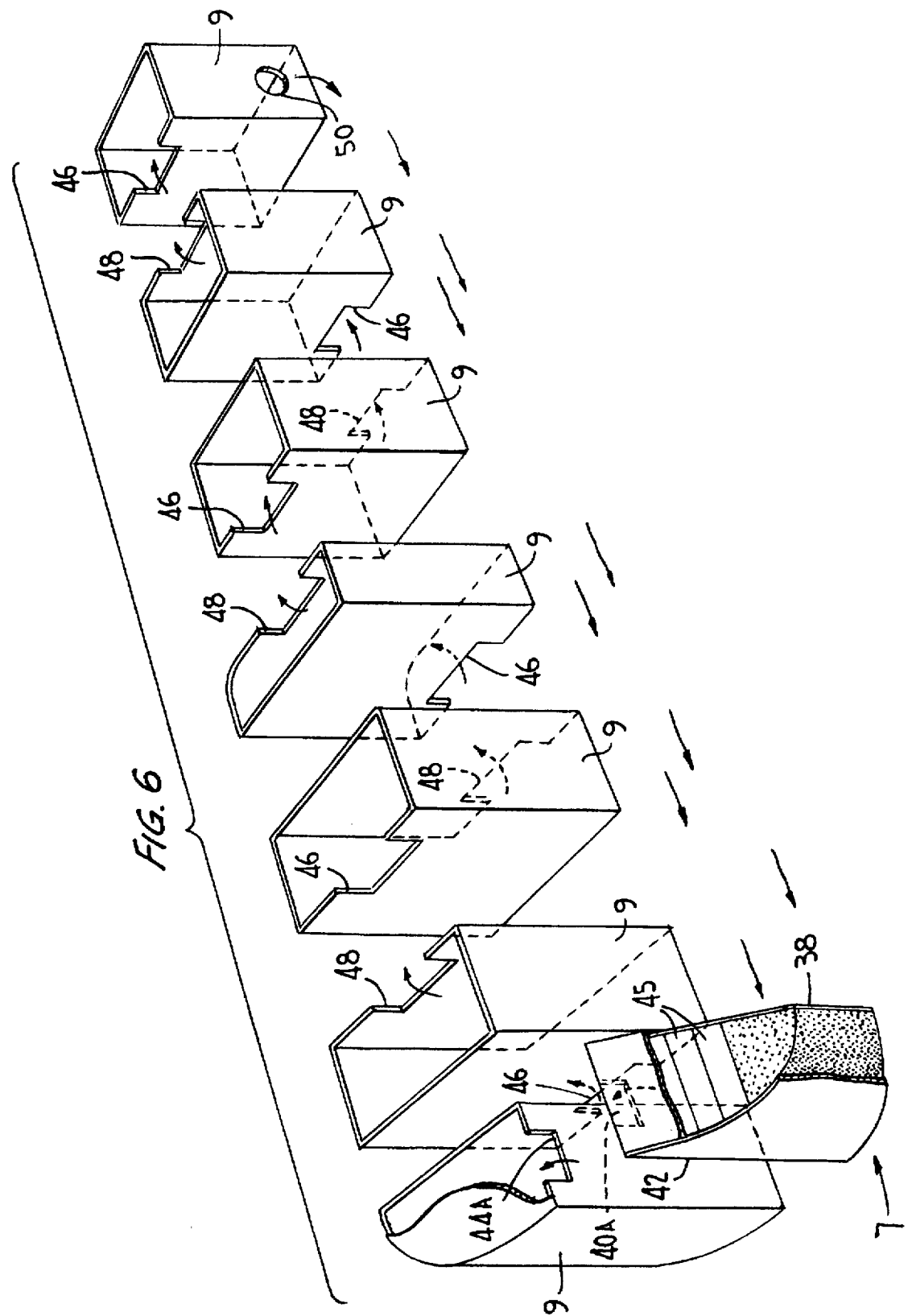

1

AQUARIUM FILTRATION SYSTEM FOR SEMI-AQUATIC ANIMALS

FIELD OF THE INVENTION

The present invention is directed to an aquarium filtration system for semi-aquatic animals, such as turtles, frogs, newts and the like. The filtration system provides for filtration from water in the aquarium of waste material or debris generated in the aquarium, while also providing a water-containing area which allows for swimming or immersion and an area which serves as an artificial seashore or sunning platform. An environment which meets the needs of a semi-aquatic animal is thus provided by the filtration system.

BACKGROUND OF THE INVENTION

Known aquarium filtration systems have been designed for use with fish. The substitution of fish filtration systems in aquariums containing turtles, newts, frogs or other semi-aquatic animals has generally failed. When the semi-aquatic animals are physically small, the waste material and debris which they produce remains within the existing parameters of a fish-containing aquarium environment. However, during growth of semi-aquatic animals, the animals will reach a point at which fish filtration systems cannot cope with the amount of waste material or debris produced by the semi-aquatic animals. Essentially, this is because many semi-aquatic animals grow larger than, and consequently produce more waste and debris than, the largest of fish kept in aquariums. The waste material produced by semi-aquatic animals is higher in nitrogen content than waste material produced by fish and also contains more undigested matter. While this waste material can serve as a nutritional source for bacteria and protozoa in the aquarium, it also results in a more rapid uptake of oxygen from the water, i.e., a higher biological oxygen demand in the aquarium. The more rapid disappearance of oxygen in turn results in the more rapid appearance of anaerobic conditions. Anaerobic bacteria metabolizing debris produces toxins and compounds which are harmful to animals living in the aquarium and are also highly odiferous. This consequently makes keeping of semi-aquatic animals difficult since the water within the aquarium must be changed often.

Water fouling of a filtration system is dependent upon the loading of the filter and the number of animals present in the aquarium. For aerobic digestion to take place, it is necessary in an aquarium to have at least three square feet of filter surface for every cubic foot of filter per pound of animal as well as a water circulation rate of at least three times per hour. Given the amount of waste, uneaten food and shed skin produced by semi-aquatic animals, filtration systems as utilized for fish suffer numerous disadvantages when used with semi-aquatic animals, i.e., they clog readily and decrease filter through-put, increase anaerobia upon decreasing filter through-put, render it difficult to clean the filter without requiring removal of the entire filter, and result in continual visibility of waste material on the aquarium bottom.

OBJECTS OF THE INVENTION

A primary object of the present invention is to provide a filtration system for semi-aquatic animals which provides adequate water filtration and circulation while also providing for an artificial pond and artificial seashore.

A further object of the present invention is to provide a modular filtration system which allows for easy removal of system components for cleaning.

Another object of the present invention is to provide a filtration system which immediately transports waste material and debris out of sight from an observer of the aquarium.

Another object of the present invention is to provide a filtration system which facilitates colonization of bacteria and protozoa and can include a biological niche for the growth of worms which participate in digestion of animal waste.

BRIEF DESCRIPTION OF INVENTION

The filtration system of the present invention provides for at least about three square feet of filter surface per cubic foot of filter material per pound of animal within an aquarium while creating an artificial embankment or seashore as well as an artificial pond for semi-aquatic animals. The filtration system of the invention is made of separable components and includes (1) a multi-layer reverse flow filter, (2) a plurality of collecting tubes which support the multi-layer reverse flow filter, (3) an inclined ramp structure which also serves as a filter, and (4) a biological filtration unit which also serves to provide an artificial seashore or embankment for sunning by semi-aquatic animals.

The multi-layer reverse flow filter preferably is made of a plurality of stacked interlocking trays with each tray having a mesh bottom wall. Preferably, the multi-layer filter includes three trays. Each tray includes a suitable filter media, preferably a particulate substance such as gravel or the like. For ease of description, gravel is referred to herein when describing the multi-layer reverse flow filter. The same considerations with regard to gradation of the gravel will apply to any other filter media used. Different sizes or grades of gravel are present in the trays. Further, different sizes of mesh are present in the bottom walls. This allows each layer of the reverse flow filter to be designed to allow for a particular desired aerobic digestion of waste material and debris and subsequent passage thereof to the next tray level as dissolution occurs. In conventional aquarium filters, a single size matrix is employed or, if gradation is present, liquid flow is provided from a smaller matrix size to a larger matrix size. In the multi-layer reverse flow filter of the invention, the size of the gravel and mesh are selected so that the liquid flow moves from a larger matrix size to a smaller matrix size. This provides one of the advantages of the present invention wherein waste material and debris are immediately moved out of sight without waiting for comminution or dissolution to occur on the top surface of the aquarium bottom, i.e., the upper surface of the reverse flow filter. Additionally, worms, large protozoa and/or bacteria can be allowed to colonize this area advantageously to increase digestion efficiency.

The plurality of collecting tubes are present beneath the multi-layer reverse flow filter and serve to support the reverse flow filter. The collecting tubes are arrayed over the area occupied by the filter thereby serving to eliminate dead spots within the filter. Additionally, the collecting tubes prevent stoppage of flow through the filter by allowing collection of fluid to occur from any part of the reverse flow filter. The collecting tubes preferably are staggered in arrangement beneath the reverse flow filter and, further, preferably include fenestrations or slots therein to provide rapid liquid collection.

The inclined ramp structure preferably has a trapezoidal configuration and serves multiple functions, i.e., (1) provides mechanical filtration due the inclusion of a filter media within the inclined ramp structure, (2) provides an inclined plane allowing entry and exit by an animal from one area of the aquarium to another area of the aquarium, namely, from the artificial pond to the sunning platform, and (3), optionally, can house a collection container for particulate matter and undigested solids. Accordingly, the inclined ramp structure provides for the combined functions of filtration, collection and access. The filter media within the inclined ramp structure is preferably in the form of at least one filter cartridge. A removable box-like container can also be present in the inclined ramp structure to collect solid waste. The inclined ramp structure preferably includes a removable top for easy access to the interior of the ramp structure and, thus, easy change and cleaning of the filter media and the collection container. The collection container can, preferably, be fitted as part of a filter cartridge. The filter cartridges and inclined ramp structure alternatively can be constructed to allow for insertion of one or more cartridges through a side wall of the inclined ramp.

The biological filtration unit provides for filtration of water as well as an upper surface area which serves as an artificial seashore or sunning platform for semi-aquatic animals. The biological filtration unit is preferably made up of a series of modular members or chambers each having a fluid inlet on one side and a fluid outlet on the opposite side. The fluid inlets and outlets are preferably positioned with respect to each other to allow for alternating water flow through the biological filtration unit and filter media contained therein. Conventional aquarium filter media, such as a Dacron matte filter, can be used. The alternating water flow allows for lengthening of the filtration path and thereby an increase in water contact with the filtration media, settling of fine suspended solids in the filter media before final filtration in the biological filtration unit, and provision of a modular design which allows for easy removal and cleaning of the individual members. The number of individual modular members making up the biological filtration unit necessarily can be varied. In fact, in a small aquarium system the biological filtration unit could be composed of one or two modular members only. One member, however, is not preferred since an alternating water flow path is not provided. Preferably positioned on top of the biological filtration unit is a tray having a fine mesh bottom. The tray preferably contains ordinary earth and gravel which can serve as a bed for moss and a sunning platform for semi-aquatic animals.

Optionally, a worm bin feature can be included in the filtration system which makes it possible to culture small worms, such as tubifex, on the organic matter and debris produced by semi-aquatic animals. The worms in turn can be fed to fish and/or semi-aquatic animals amenable thereto.

BRIEF DESCRIPTION OF THE DRAWING

FIG. 4 illustrates a preferred embodiment of an arrangement of collecting tubes for positioning beneath the multi-layer reverse flow filter.

FIG. 5 shows an exploded perspective view of one embodiment of modular members making up the biological filter unit and the inclined ramp structure. The water flow direction is indicated by the arrows in the figure.

FIG. 6 shows an exploded perspective view of a second embodiment of modular members making up the biological filter unit and the inclined ramp structure. The water flow direction is indicated by the arrows in the figure.

DESCRIPTION OF PRESENTLY PREFERRED EMBODIMENTS

The filtration system of the present invention is designed for use in conventional aquariums, for example, such as a commercial 120 gallon aquarium having dimensions of 48"×24"×24". Necessarily, different sizes of aquariums can be utilized and the filtration system size adjusted accordingly. The filtration system of the invention is structured to provide at least about three square feet of filter surface area per cubic foot of filter material per pound of animal within an aquarium.

The components of the filtration system preferably are each constructed of plastic as known for use in aquariums, such as solvent-welded Plexiglass, nylon netting and polyvinyl chloride plastics. Preferably, a 0.2" stock is utilized for the filtration system components. The thickness of the stock, however, can be adjusted based on specific use.

Circulation of water through the filtration system is accomplished using a conventional aquarium pump. The size of the pump will depend on the calculated turnover rate and flow needs of a particular sized aquarium system. Generally, the water flow rate must be in excess of 3 complete circuits of the water contained in the aquarium per hour to remain aerobic.

The filter media utilized in the multi-layer reverse flow filter can be composed of one or more materials. Various sizes or grades of porous Rhyolite (pumice rocks or chips), gravel, commercial Dacron matte filter, sintered glass material of certain porosities, and the like can be utilized. Gravel is preferred and is generally used in grades of between about 1 cm to 3 cm. These materials can also be utilized in the biological filtration unit as the filter media. The porosity provided by the filter media is chosen to produce maximum filtration possible with respect to flow and aerobic digestion of waste material and debris such as uneaten food.

Figure 1:
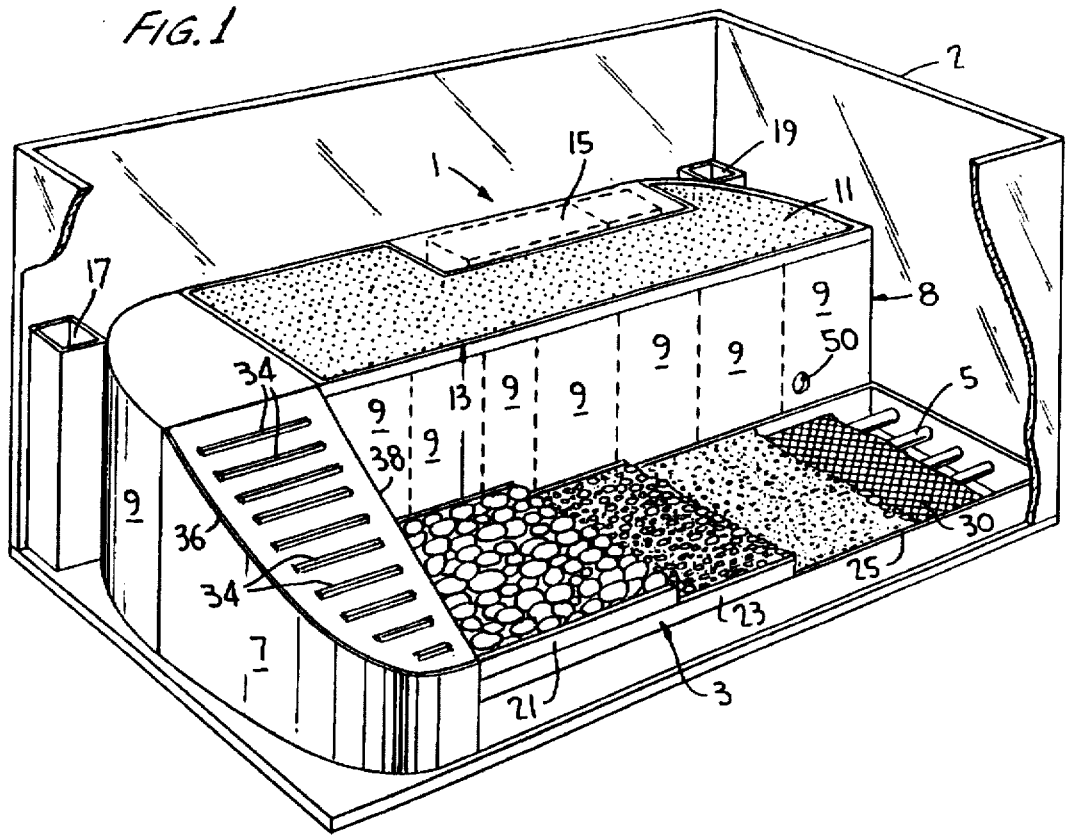
FIG. 1 is a perspective cut-away view of an aquarium containing the filtration system of the invention.
Figure 2:
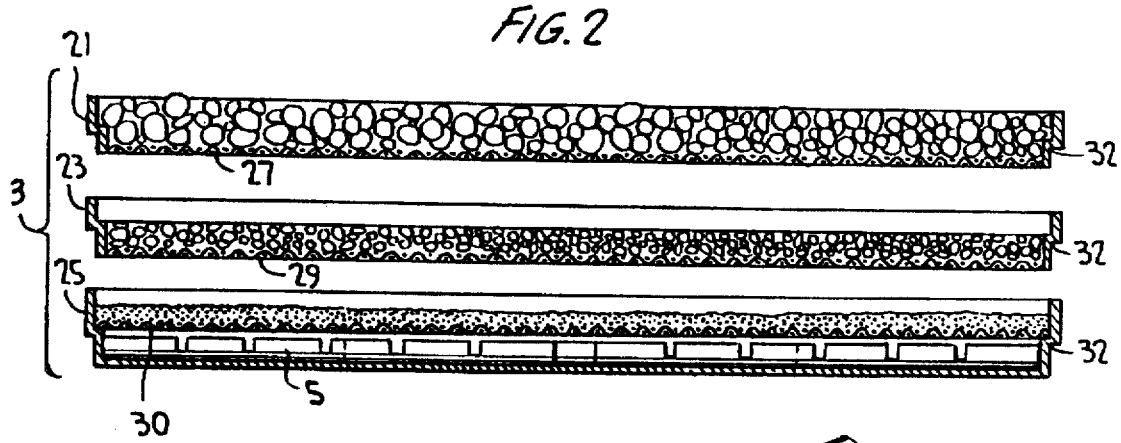
FIG. 2 is a cross-sectional exploded view of the multi-layer reverse flow filter positioned on top of collecting tubes.

With reference to the drawing, FIG. 1 illustrates the filtration system 1 of the invention positioned within a conventional rectangular aquarium 2. The multi-layer reverse flow filter 3 is illustrated as a three layer gravel filter as also shown in FIG. 2 and described further below. A plurality of collecting tubes 5 are positioned beneath the multi-layer reverse flow filter so as to support the reverse flow filter. An inclined ramp structure 7, which also preferably functions as a filter, leads from a first area of the aquarium containing the reverse flow filter to a second area of the aquarium containing the biological filtration unit 8 made up of modular members 9. As illustrated, the biological filtration unit preferably has a tray 11 positioned thereon. Tray 11 serves as a sunning platform for semi-aquatic animals within the aquarium. The aquarium can be filled with water to an appropriate level along the length of arrow 13 and thereby provide for an artificial pond present above the reverse flow filter. The water level may be such as to slightly cover the sunning platform. A pump 15 is present at a suitable location in the filtration system structure to provide for circulation or flow of water through the filtration system. As illustrated in FIG. 1, pump 15 is situated in a cut-out area within the biological filtration unit.

Structure 17 indicates generally the presence of a conventional water level maintenance device as commercially available to insure that a desired water level is maintained within the system. Such a device is utilized when the aquarium is connected to an automatic water refill device.

Further, structure 19 indicates a return water or drainage pipe to allow for the return of water back into the bottom of the aquarium from the top of or around the biological filtration unit. Necessarily therefore, the water level maintenance device and the return water pipe are of a height based on the needs of the aquarium system in view of the semi-aquatic animals living therein.

The inclined ramp structure and biological filtration unit can be shaped to allow for placement of plants around the filtration system. As shown in FIG. 1, the corners can be curved to allow for space to position plants therein.

More specifically with regard to the individual components of the filtration system, a preferred embodiment of a multi-layer reverse flow filter is illustrated in FIGS. 1 and 2. The preferred embodiment includes three trays 21, 23 and 25 which include a mesh 27, 29 and 30, respectively, as a bottom wall of the trays. The sidewalls of the trays preferably include a step 32 which allows for interlocking stacking of the trays in relation to each other. Each tray includes a filter media, such as the gravel illustrated. The filter media of each tray is of a different size or grade from the filter media of the other trays. Tray 21 includes a larger size or grade of gravel whereas tray 23 then includes a lesser size than tray 21 and tray 25 includes a lesser size than that contained in tray 23. Accordingly, a reverse order of gradation from larger to smaller is present in the trays. This allows for immediate removal of waste material and debris from sight within the aquarium while also controlling the filtration and dissolution of waste material and debris as it enters the filtration system through the multi-layer reverse flow filter. The size of the mesh in each tray bottom wall is chosen to allow for slow aerobic digestion of waste material, uneaten food and other debris while allowing for subsequent passage to the next lower level as dissolution occurs. Worms, large protozoa and bacteria can, optionally, be allowed to colonize within the gravel of the reverse flow filter if desired. This will allow for increased digestion efficiency.

Figure 3:
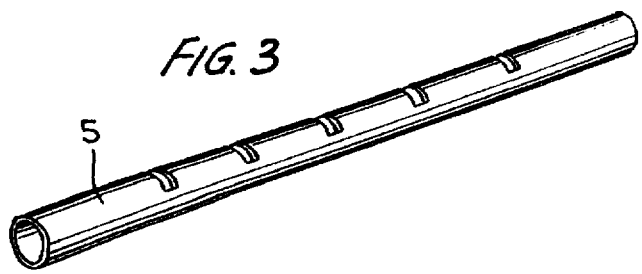
FIG. 3 is a perspective view of a collecting tube having slots therein.

Arranged beneath lowermost tray 25 are a plurality of collecting tubes 5 as shown in FIGS. 2–4. The collecting tubes preferably are cylindrical with slots or fenestrations present therein. The collecting tubes serve to support the reverse flow filter and eliminate dead spots within the reverse flow filter by preventing stoppage of the flow of water and allowing for collection of liquid to occur from any part of the reverse flow filter. The slots within the collecting tubes permit rapid liquid collection while at the same time allowing for good support of the reverse flow filter structure. A preferred arrangement of the collecting tubes is illustrated in FIG. 4. The positions of the collecting tubes relative to each other can be staggered. The collecting tubes are not required to fill the entire area beneath the reverse flow filter in order to provide the functions as described above. This saves costs in relation to material required to make the filtration system.

The inclined ramp structure 7 as illustrated in FIGS. 1, 5 and 6 serve as an exit and entry means between the artificial pond positioned above the reverse flow filter and the sunning platform present on top of biological filtration unit 8. The inclined ramp structure preferably includes spaced upward rising projections 34 in order to provide for better footing for the animals traversing the upper surface of the inclined ramp structure. The configuration of these upraised projections can be of any desired shape or size depending upon the animals within the system. The preferred forms are ribs which extend across the width of the upper surface as illustrated in FIG. 1 which serve to uniformly prevent backsliding on the inclined ramp structure.

The inclined ramp structure 7 preferably includes a removable top 36 so that the interior of the inclined ramp structure can be easily accessed. Present within the interior of inclined ramp structure 7 is preferably a filter media and a collection container for particulate matter and undigested solids. The filter media can be present as one or more removable filter cartridges. The collection container can be present as a removable box-like container present as an independent structure or present within a filter cartridge. Upon removal of top 36, the filter cartridge(s) and collection container can thus be easily removed and either cleaned prior to replacement or replaced with another cartridge(s) and/or collection container. Alternatively, the inclined ramp structure 7 can have one or more openings in a side wall thereof which complement the shape of one or more filter cartridges which are insertable into the openings. The cartridges are thus accessible from the side of the ramp structure. The ramp structure is present as an independent component which can easily be lifted out of the aquarium for access and cleaning.

Figure 7:
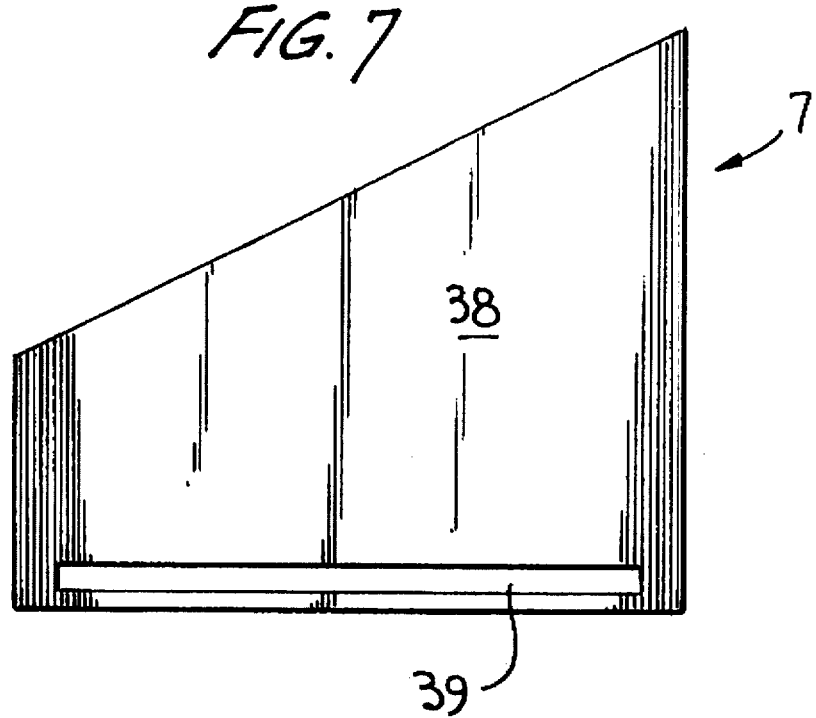
FIG. 7 is a side view of inclined ramp structure 7 showing an opening therein.
Figure 8:
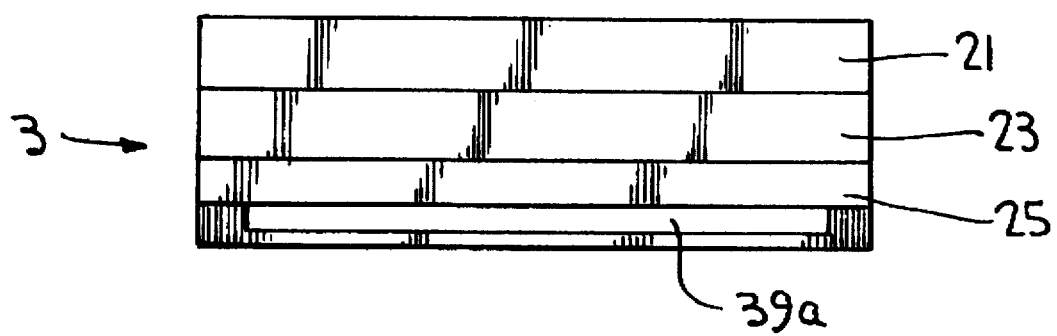
FIG. 8 is an end view of multi-layer reverse flow filter 3 as shown in FIG. 1.

The inclined ramp structure will have one or more suitable openings in sidewall 38 of the ramp structure to allow for flow of water into the interior of the ramp structure and thus into and through the filter media within the ramp structure, for example opening 39 as shown in FIG. 7 which continues liquid circulation from filter 3 via opening 39a shown in FIG. 8. Another opening, 40 in FIG. 5 and 40A in FIG. 6, is present in the back wall 42 of the inclined ramp structure to allow for continued flow of water through the inclined ramp structure and into the biological filter units 9. Opening 40 or 40A is situated adjacent an opening, 44 in FIG. 5 and 44A in FIG. 6, which is present in an end unit of the biological filtration units 9. The advantage to the aligned top openings 40A and 44A as shown in FIG. 6 over the side openings 40 and 44 as shown in FIG. 5 is that water is allowed to readily collect and more completely fill the interior of the inclined ramp structure and thus the filter media therein. The inclined ramp structure of FIG. 6 is shown to include filter cartridges 45. As described above, the ramp structure can be designed to allow for insertion of the filter cartridges through the top wall or a side wall of the ramp structure.

The biological filtration unit 8 is illustrated in FIGS. 1, 5 and 6 and includes in a preferred embodiment a plurality of substantially rectangular modular members 9 including alternating fluid inlets 46 in one side of the members and fluid outlets 48 in the opposite side of the members. As indicated by the arrows in FIGS. 5 and 6, the positioning of the inlets 46 and outlets 48 allow for an alternating flow path for the water as it circulates through the biological filtration unit. It is noted that, in FIG. 6, the fluid outlet in the modular member adjacent the inclined ramp structure is not visible in this view. Since the fluid inlet 44A is in the top of the modular member, however, it is understood that the fluid outlet is in the bottom in order to provide alternating fluid flow. Each modular member 9 of the filtration unit 8 contains an appropriate biological filter media as commercially available, such as Rhyolite, Dacron matte filter and the like. The alternating flow path through the modular members 9 lengthens the filtration path and thereby increases the area of contact between the water and the filter media. This also allows for increased settling of fine suspended solids within the modular members prior to final filtration in the biological filtration unit. The modular design of the biological filtration unit, i.e., the plurality of members 9 as illustrated in FIGS. 5 and 6, allows for easy removal and cleaning of the individual members. Each member can be removed individually and cleaned and then replaced followed by the removal of another member. As indicated, opening 44 or 44A in one end member of the biological filtration unit provides for entry of circulating water into the filtration unit while opening 50 in the opposite end member allows for exit of the water from the biological filtration unit and return to the artificial pond.

Situated on top of the biological filtration unit 9 is a tray 11 having a fine mesh bottom wall. The tray can contain ordinary earth and gravel and provide a bed for moss. The tray thereby provides for a sunning platform or artificial seashore for the semi-aquatic animals present in the aquarium. If desired, the water level within the tank can include a small portion on top of tray 11 to provide continual moisture to the animals and any plants present. Due to the mesh bottom wall and the preferred open top of the modular members 9 as shown in FIGS. 5 and 6, water on top of tray 11 can flow downward into the circulating flow of water passing through the biological filtration unit 8. Further, if the water level is not maintained to cover at least some of the tray, moisture will be present through the bottom mesh wall of the tray from the open topped units 9. Further, a drainage or water return pipe 19 can be present so that the water present above, or around the edges if space is provided, of the biological filtration unit can be maintained within the circulating flow of water through the filtration system. Necessarily, the top of the biological filter unit can be closed and serve as a sunning platform in itself. However, if gravel or plant life is used, a tray allows for easy removal and replacement when the filtration unit must be cleaned.

One or more of the individual modular members 9 of the biological filtration unit can be modified, for example, to include a worm bin. A worm bin can be situated in one or more of the modular members to allow for culturing of small worms, such a tubifex, on the organic matter and debris produced by the semi-aquatic animals. These cultured worms can then be utilized to feed fish or semi-aquatic animals amenable thereto.

Accordingly, the filtration system of the present invention provides for a complete circulating flow of water through the system and the collection during such circulation of waste material and debris present in the water by different filtration media. The waste material and debris are either maintained in the filter media for subsequent removal or provided with an environment which allows for dissolution of the waste material and/or debris. The filtration system is also structured to provide for an artificial pond and an artificial sunning platform within the system to meet the environmental needs of semi-aquatic animals living within the aquarium. The filtration system allows for continual collection of waste material and debris in amounts as produced by juvenile and adult semi-aquatic animals without the need for continual repeated cleanings while maintaining an aquarium visually appealing to an observer and providing a beneficial environment for the semi-aquatic animals.

As will be apparent to one skilled in the art, various modifications can be made within the scope of the aforesaid description. Such modifications being within the ability of one skilled in the art form a part of the present invention and are embraced by the appended claims.

It is claimed:

1. A filtration system for removing waste material and debris from water comprising (1) a multi-layer reverse flow filter; (2) a plurality of collecting tubes positioned beneath said multi-layer reverse flow filter; (3) an inclined ramp structure including therein at least two openings and a filter media, and (4) a biological filtration unit having at least two openings therein; wherein said inclined ramp structure leads from an area above a top surface of said multi-layer reverse flow filter to a top surface of said biological filtration unit; and wherein components (1), (2), (3) and (4) are constructed and arranged in relation to each other so as to provide a flow path of continuing liquid circulation through each of components (1), (2), (3) and (4) when the filtration system is utilized in conjunction with water and a pump mechanism which provides circulation of the water.

2. Filtration system according to claim 1 wherein said multi-layer reverse flow filter comprises a plurality of stacked trays, each tray having a mesh bottom wall and filter media present in each tray, wherein said filter media present in an upper tray of said plurality of stacked trays has a higher flow-through rate than filter media present in a lower tray in said plurality of stacked trays.

3. Filtration system according to claim 2 wherein said filter media is a particulate material.

4. Filtration system according to claim 3 wherein said particulate material is gravel.

5. Filtration system according to claim 2 wherein each tray of said plurality of trays includes stepped sidewalls so that one tray interlocks with another tray upon stacking.

6. Filtration system according to claim 1 wherein said plurality of collecting tubes contain openings in sidewalls of said collecting tubes.

7. Filtration system according to claim 1 wherein said plurality of collecting tubes are present in a staggered arrangement in relation to each other.

8. Filtration system according to claim 1 wherein said biological filtration unit includes a plurality of individually removable modular members containing filter media, each of said plurality of modular members including an ingress opening and an egress opening.

9. Filtration system according to claim 8 wherein said biological filtration unit includes a tray positioned on top of the biological filtration unit.

10. Filtration system according to claim 1 wherein said biological filtration unit includes a tray positioned on top of the biological filtration unit.

11. Filtration system according to claim 1 wherein said inclined ramp structure further includes a removable top wall.

12. Filtration system according to claim 1 wherein said filter media present in said inclined ramp structure is at least one removable filter cartridge insertable through a side wall of said inclined ramp structure.

13. Filtration system according to claim 1 wherein said filter media present in said inclined ramp structure is at least one removable filter cartridge insertable through a top wall of said inclined ramp structure.

14. Filtration system according to claim 1 used in conjunction with an aquarium.

* * * * *